Aug. 26, 1952   J. C. CURTIS   2,608,180
ROCK DRILL
Filed May 27, 1949   2 SHEETS—SHEET 1
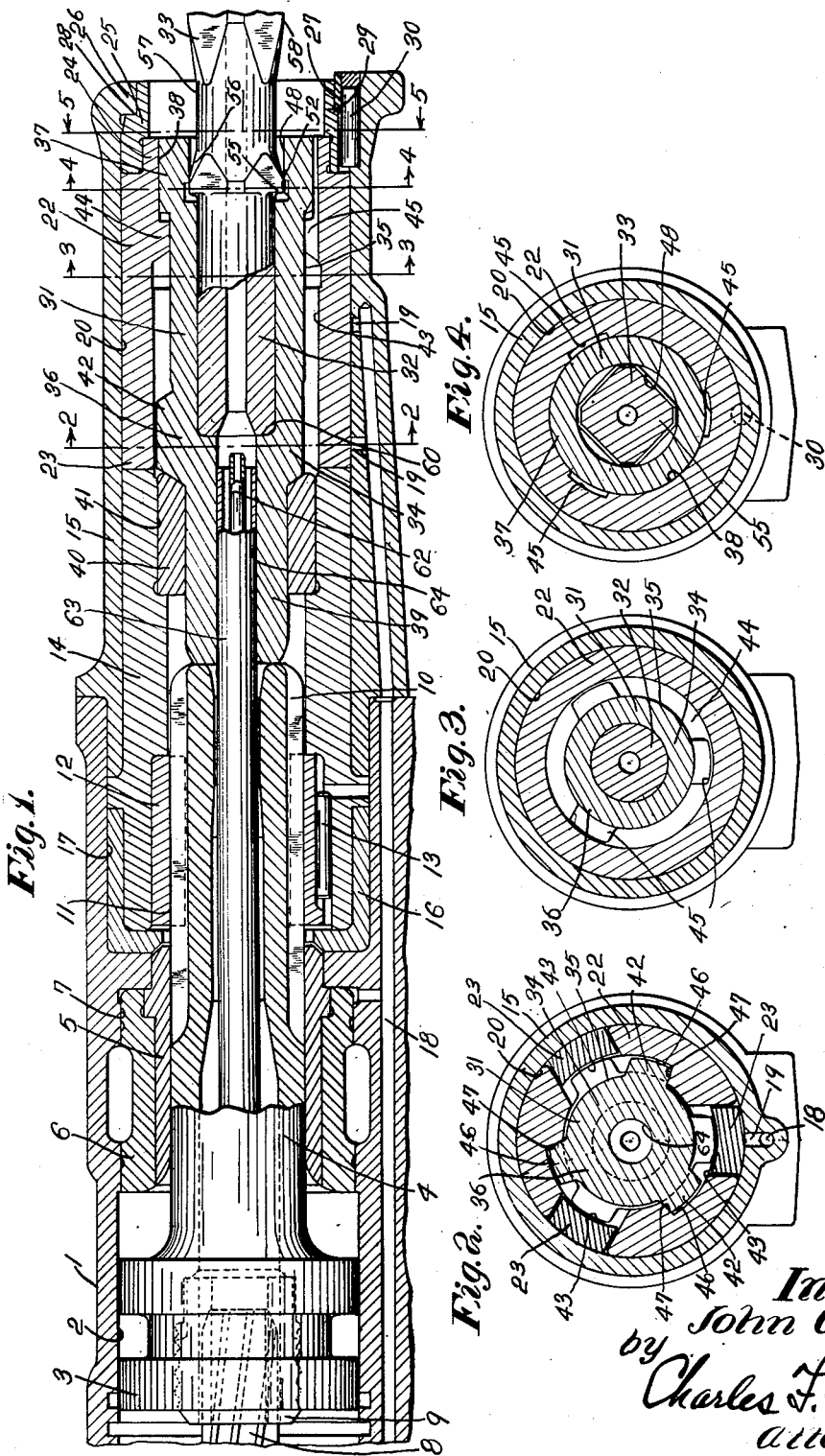
Inventor:
John C. Curtis.
by Charles F. Osgood
Attorney.

Aug. 26, 1952
J. C. CURTIS
2,608,180
ROCK DRILL
Filed May 27, 1949
2 SHEETS—SHEET 2
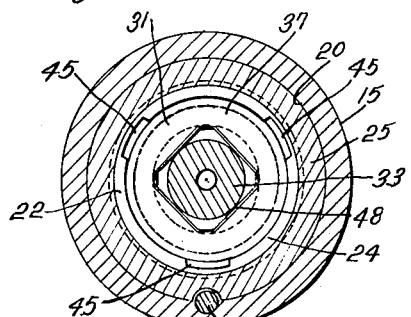
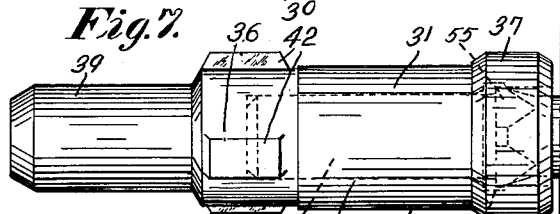
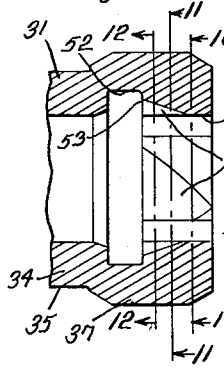
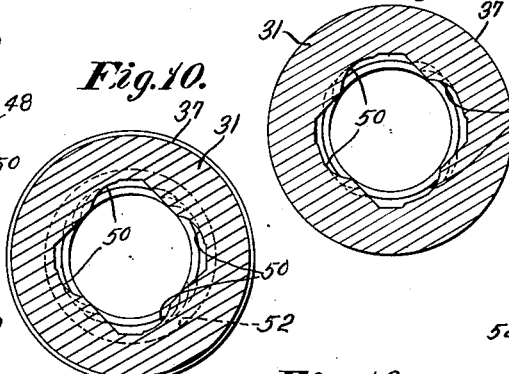
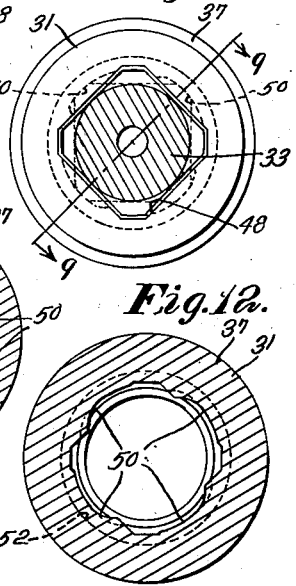
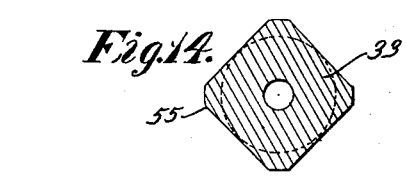
Inventor:
John C. Curtis:
by Charles F. Osgood
attorney.

Patented Aug. 26, 1952

2,608,180

UNITED STATES PATENT OFFICE 2,608,180

ROCK DRILL

John C. Curtis, Claremont, N. H., assignor to Joy Manufacturing Company, Pittsburgh, Pa., a corporation of Pennsylvania Application May 27, 1949, Serial No. 95,835

19 Claims. (Cl. 121—32)

This invention relates to rock drills and more particularly to a chuck mechanism and drill steel for a hammer rock drill.

In conventional hammer rock drills it is common practice to connect loosely a lugged shank of a drill steel in a rotatable driver contained in a chuck housing, with the steel shank supported in a chuck bushing in turn supported within a rotatable chuck sleeve which drives the rotatable driver. The steel shank reciprocates relative to the bushing and driver as it is percussively actuated by the hammer piston of the percussive motor, and, resultantly, considerable wear between the parts occurs. Also since the steel shank is loosely reciprocably mounted, proper alignment of the steel shank with the hammer piston is practically impossible. Further, the steel shank must be reformed at times as by forging, as the result of excessive wear and frequent breakage. The loosely mounted steel shank also prevents the attainment of full drilling efficiency. Moreover, in such drills the cleansing fluid conducting tubes are inadequately supported and protected at their forward ends, resulting in frequent breakage and, due to the lack of large bearing areas for the chuck parts, substantial fluid leakage resulting in loss of hole blowing efficiency, is unavoidable. The steel shanks of conventional drill steels also vary considerably so that the hammer piston must deliver its blow on the steel shank at different points in its working stroke instead of always delivering its blow at the most effective point in its travel thereby further decreasing drilling efficiency.

The present invention contemplates improvements over such known types of rock drills in that the driver or chuck member is firmly locked to the steel shank and the driver is not only rotatable with a chuck part secured to the driving sleeve but is slidingly interlocked with the rotatable chuck part so that it may reciprocate in unison with the steel shank. Thus increased drilling speed and improved wearing qualities are attained. In accordance with the present invention the rotatable and reciprocable driver for the steel shank has widely spaced bearing surfaces not only increasing the resistance to wear but also maintaining the steel shank at all times in alignment with the hammer piston. Since the steel shank is rigidly locked in the driver and the piston blows are imparted to the rear striking surface of the driver instead of directly to the steel shank, uniformity of piston blow is attained greatly increasing the drilling speed, since the piston always delivers its blow at the most effective point in its travel. Also, in accordance with the present invention, the possibility of breakage of the cleansing fluid conducting tubes is reduced to a minimum since the outer tube is always firmly guided at its forward end in a finished bore in the rearward portion of the rotatable and reciprocable steel driver. Due to the large bearing areas for the chuck parts, leakage is reduced to a minimum, so that a more effective hole blowing function is attained. The driver is also guided at its rearward portion in a renewable bushing carried by the rotatable chuck sleeve so that the bearing surface for the rear end of the driver is located in adjacency to the main point of wear i. e. at the point where the piston delivers its blow. The structure of the present invention is rugged and simple in design and may be readily adapted to a conventional rock drill with but small change.

An object of the present invention is to provide an improved chuck mechanism and drill steel for a hammer rock drill. Another object is to provide an improved chuck mechanism wherein the driver or chuck member is rigidly locked to the steel shank whereby the usual looseness and resultant wear between the parts are avoided. Still another object is to provide an improved chuck mechanism embodying a steel driver which is both rotatable and reciprocably mounted and which is slidingly interlocked with the rotatable driving sleeve of the chuck. A further object is to provide an improved rotatable and reciprocable driver for a drill steel shank wherein relatively large and widely spaced bearing surfaces therefor are provided thereby greatly increasing the resistance to wear. A still further object is to provide an improved driver to which the steel shank is rigidly locked and which rotates and reciprocates with the steel shank and having a rear striking surface to which the blows of the hammer piston are delivered. Yet another object is to provide an improved driver and drill steel wherein the steel shank is rigidly locked in the driver in an improved manner and may be readily released from the driver when desired. Still another object is to provide an improved rock drill steel having a novel shank and locking structure. A still further object is to provide an improved guiding and supporting arrangement for a cleansing fluid conducting tube whereby the tube is firmly guided at its forward portion in a bore in the reciprocable steel driver thereby reducing the possibility of breakage of the forward portion of the tube. Another object is to provide relatively large bearing surfaces for the chuck parts, whereby fluid leakage is reduced to a minimum, resulting in improved and more efficient hole blowing. A still further object is to provide an improved reciprocable driver for a rock drill steel having a rearward portion to which the piston blows are delivered and having an improved renewable guide bushing structure whereby the driver is firmly supported at a point in adjacency to where the piston blows are delivered thereon. Yet another object is to provide an improved bayonet type locking joint whereby the steel shank may be rigidly locked in the rotatable and reciprocable steel driver and may be released from the driver when desired. These and other objects and advantages of the invention will, however, hereinafter more fully appear.

In the accompanying drawings there is shown for purposes of illustration one form which the invention may assume in practice.

In these drawings:

Fig. 1 is a central longitudinal vertical sectional view taken through a hammer rock drill in which a preferred illustrative form of the invention is embodied.

Figs. 2, 3, 4 and 5 are cross sectional views taken respectively on lines 2—2, 3—3, 4—4 and 5—5 of Fig. 1, and illustrating structural details.

Fig. 6 is a fragmentary sectional view taken on the plane of Fig. 1 with a portion of the steel shank broken away to show details of the shank lock within the steel driver.

Fig. 7 is a side elevational view of the rotatable and reciprocable driver and drill steel, with the steel shank disposed in locked position within the driver.

Fig. 8 is an enlarged cross sectional view taken on line 8—8 of Fig. 7.

Fig. 9 is a longitudinal extending detail sectional view taken on line 9—9 of Fig. 8 through the driver.

Figs. 10, 11 and 12 are cross sectional views taken respectively on lines 10—10, 11—11 and 12—12 of Fig. 9, showing details of the locking means for the steel shank.

Fig. 13 is a side elevational view of the drill steel showing a detachable drill bit locked to the forward end of the steel and with the drill bit shown partially with longitudinal section.

Fig. 14 is an enlarged cross sectional view taken on line 14—14 of Fig. 13.

The invention in the illustrative embodiment shown is embodied in a hammer rock drill which comprises a fluid actuated percussive motor having a motor cylinder 1 provided with a bore 2 containing a reciprocable hammer piston 3. The hammer piston has a reduced forward extension or striking bar 4 which is reciprocably and rotatably guided in a wear sleeve 5 carried in a front buffer ring 6 secured in a bore 7 at the front end of the motor cylinder. Associated with the hammer piston is a conventional ratchet and pawl type rotation device including a spirally grooved rifle bar 8 slidingly interlocked with the spiral lugs of a rifle nut 9 secured within the rearward portion of the hammer piston. Thus as the hammer piston moves rearwardly in the cylinder bore the rifle bar 8 is automatically locked against rotation by the pawls of the ratchet device, causing the hammer piston to rotate as it moves rearwardly, and when the piston moves forwardly in the cylinder bore the pawls slip over the ratchet teeth freeing the rifle bar 8 for rotation so that the hammer piston effects its working stroke without rotation thereby to deliver an unimpeded blow, all in a manner well-known to those skilled in the art.

The striking bar is formed with longitudinal grooves 10 which engage straight keys 11 of a chuck nut 12 secured as by a key 13 within a rotatable chuck sleeve 14 which is journaled in a front chuck housing 15 suitably attached to the front end of the motor cylinder. The rearward portion of the chuck sleeve is rotatably mounted in a wear bushing 16 arranged in a bore 17 in the forward portion of the motor cylinder. A usual lubricator for the moving parts of the drill is provided and includes a passage 18 which communicates through spaced ports 19, 19 with the bore 20 of the chuck housing 15. The percussive motor is provided with a usual throttle valve and fluid distributing means including an automatic distributing valve mechanism and flow passages controlled thereby for effecting reciprocation of the motor piston. As the structure above described is conventional and well-known further description thereof is herein unnecessary.

Now referring to the improved chuck mechanism and drill steel, it will be noted that rotatably mounted in the bore 20 of the chuck housing is a front chuck part 22 which is connected as by clutch jaws 23, or otherwise, to the front end of the rotatable chuck sleeve 14 so that the front chuck part and chuck sleeve rotate together as the motor piston reciprocates. The chuck part 22 has a reduced forward portion 24 journaled in a wear bushing 25 arranged in the chuck housing bore. The chuck housing has an inwardly directed front circular flange 26 surrounding a front bore 27 and the wear bushing has a front shoulder 28 engaging the rear flange surface and is externally reduced at 29 to fit the bore 27 as shown in Fig. 1. The wear bushing 25 is secured to the chuck housing as by a key 30. Arranged in the front chuck part 22 is a rotatable and reciprocable driver or chuck member 31 which receives the shank 32 of a drill steel 33 of a novel design, so that the driver and drill steel rotate and reciprocate in unison. This driver has a cylindrical body 34 externally reduced at 35 to provide spaced enlargements 36 and 37, and the front enlargement 37 has a cylindrical peripheral surface slidingly mounted in a front bore 38 in the front chuck part 22. The driver body has a reduced rearward portion 39 reciprocably mounted in a wear bushing 40 secured in a forward bore 41 in the rotatable chuck sleeve 14. The rear enlargement 36 is formed with external splines or teeth 42 which are received in longitudinal grooves 43 in the front chuck part. The chuck part 22 has an internal flange 44 which is formed with three equally spaced slots or grooves 45.

The slots 45 are disposed in alignment with portions of the grooves 43 so that the keys 42 of the driver may be inserted through the key slots 45 and shoved rearwardly into the grooves 43, and the latter have lateral portions at 46 out of alignment with the slots 45 so that upon rotation of the driver the keys 42 may be positioned laterally in the lateral groove portions 46 out of alignment with the slots 45 to lock the driver within the front chuck part 22. The inner walls of the lateral groove portions 46 provide driving surfaces 47 which engage the adjacent sides of the keys 42 so that as the chuck part 22 is rotated the driver is rotated therewith. By giving the driver a partial turn in the reverse direction i. e. a direction opposite to the direction of rotation of the drill steel, the keys 42 may again be brought into registry with the key slots 45 so that the driver may be axially withdrawn forwardly from the chuck part 22. Thus a key and slot type lock is provided for the driver for retaining the latter within the chuck. The grooves 43, 46 are of substantial length so that as the driver reciprocates with the drill steel the keys 42 are maintained against the driving surfaces 47. The driver 31 has a polygonal front opening 48 which is generally square in cross section as shown in Fig. 8 and the sidewalls of this opening are formed with cam surfaces 50 which become increasingly wider as they extend rearwardly. An annular recess 52 is formed in the driver rearwardly of the opening 48 and the cam surfaces 50 extend to and cut through the rearward wall 53 of this recess as shown in Fig. 9. The drill steel 33 is preferably machined from properly shaped bar stock and has a lug portion 55 at its shank end and this lug portion is of polygonal cross section corresponding to the shape of the cross section of the front opening 48 in the driver, and the steel is tapered at 56 in advance of the lug portion. The drill steel is reduced in cross section at 57 between the forward tapered surfaces of the lug portion 55 and the polygonal body 58 of the steel. The cylindrical shank 32 of the drill steel may be inserted into the bore of the driver 31 and driven rearwardly to bring the lug portion 55 into the polygonal opening 48 of the driver and the steel may then be turned slightly to cause the surfaces of the tapered portion 56 to engage the cam surfaces 50 within the driver, and these coacting surfaces, as the steel is rotated, force the steel shank rearwardly with a camming action within the driver to bring the rear end of the steel shank into firm abutting engagement with a shoulder 60 at the rear end of the shank receiving bore. When the steel shank is thus positioned within the driver, the polygonal lugged portion 55 of the shank is disposed out of registry with the polygonal opening 48 so that the steel shank is firmly locked against forward release from the driver. Thus a releasable bayonet type lock is provided for the steel shank. A chuck member or driver is rigidly secured to each steel shank, and normally remains on the steel shank, and is removed from the chuck housing with the drill steel.

As is usual in hammer rock drills cleansing fluid is conducted through the drill steel to the bottom of the drill hole to clear away the cuttings and in this improved construction a water tube 62 extends centrally through the percussive motor and terminates at its forward end in adjacency to the rear end of the shank of the drill steel as shown in Fig. 1. Surrounding this water tube is a large air tube 63 likewise extending centrally through the percussive motor and terminating at its forward end in adjacency to the steel shank a slight distance rearwardly of the front end of the water tube. The hammer piston and rifle bar have suitable bores for receiving the air tube and these tubes at their rear ends are connected in a conventional manner to suitable sources of water and air under pressure. The driver 31 has formed within its rearward portion a reduced bore 64 which is ground-finished to provide a smooth supporting surface for the forward portion of the air tube. Thus the forward end of the air tube is at all times guided with the driver so that the possibility of breakage is substantially avoided. By the provision of the widely spaced bearing surfaces for the driver alignment of the driver with the hammer piston is maintained and substantial fluid leakage past the driver is prevented. Rotation of the driver during operation of the drill tends to effect tightening of the steel lock within the driver, and, upon removal of the driver from the chuck housing, the steel shank may be rotated in a reverse direction relative to the driver so that the steel shank may be unlocked and driven forwardly from the driver through the front opening 48.

As shown in Fig. 13 the drill steel has a detachable rock drill bit 65 attached to its forward end and the attaching means is, in this instance, likewise of the bayonet type. This attaching means comprises a lock portion 66 of polygonal cross section similar to the lugged portion 55 of the steel shank. The drill steel has in advance of the lugged portion 66 a cylindrical reduced portion 67 which is received in a bore 68 formed in a skirt portion 69 of the drill bit. This skirt portion has a polygonal rear opening 70 similar to the driver opening 48 and separated from the bore 68 by an annular recess 71. The walls of the opening 70 are formed with cam surfaces similar to the surfaces 50 on the steel shank and the steel has a tapered portion 72 rearwardly of the lug portion 66. The drill bit is herein shown as the conventional cross-wing type having diametrically arranged cutting edges 73 disposed in right angular relation. When the skirt of the drill bit is placed on the front end of the drill steel with the reduced portion 67 received in the skirt-bore 68 it may be rotated to bring the tapered surfaces 72 into engagement with the cam surfaces to force the front wall 74 of the bore firmly against the front end surface of the drill steel, and to bring the polygonal portion of the steel out of registry with the polygonal bit opening 70, thereby to lock rigidly the drill bit and steel together. By simply turning the drill bit in the reverse direction relative to the steel the lock may be readily released.

As a result of this invention an improved hammer rock drill is provided having an improved chuck mechanism and drill steel whereby drilling efficiency and the life of the parts are substantially increased. By rigidly locking the shank of the drill steel in a reciprocable and rotatable chuck part which has widely spaced bearing surfaces of large area, wear is not only substantially reduced but also the steel shank is maintained in alignment with the hammer piston. By securing the steel shank rigidly in the reciprocable chuck part and by delivering the piston blows to the clutch the drilling speed is substantially improved due to the fact that the hammer piston always strikes its blow at the most effective point in its working stroke. Moreover, piston wear is decreased and breakage is reduced since the piston always strikes against a part which is machine-finished and composed of hardened and ground steel instead of a rough piece of forged drill steel as in conventional rock drills. The relatively tight fits between the driver and the chuck parts and between the driver and steel shank prevents substantial leakage of fluid between the parts. Since the drill steel shank is machine-turned instead of forged such relatively tight fits between the parts are possible. By making the driver reciprocable in unison with the steel shank, the driver acts as a tappet which effectively transmits the piston blows to the drill steel, and since the parts are rigidly united power losses are maintained at a minimum. By the provision of the key type locks for the driver and the steel shank these parts may be readily removed and when locked in position within the chuck inadvertent release of the parts is prevented. By the provision of a similar type lock for the detachable drill bit the latter may be rigidly attached to the drill steel and readily removed when desired. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a rock drill, a rotatable chuck, a reciprocable drill steel driver contained in said chuck and having sliding interlocking connection therewith whereby said chuck and driver rotate in unison while permitting free reciprocation of said driver relative to said chuck, said driver having a forward socket for receiving the shank of a drill steel, a drill steel having a shank receivable in said socket, means for rigidly securing said steel shank in said socket including a central opening within the forward portion of said driver and communicating with said socket, said opening having spaced recesses and said shank having equally spaced lugs which enter and pass through said recesses when said shank is inserted into said socket through said opening, and said shank being rotatable relative to said driver to move said lugs out of registry with said recesses to lock said lugs within said driver with said lugs located intermediate said recesses, and means within said driver for limiting said rotative movement of said shank relative to said driver whereby said shank and driver rotate together when said shank is in its locked position within said driver.

2. In a rock drill, a rotatable chuck having a chamber, a reciprocable drill steel driver contained in said chamber in said chuck, means effective upon rotation of said driver relative to said chuck for locking said driver within said chuck chamber while permitting free reciprocation of said driver relative to said chuck, means providing a sliding interlocking connection between said driver and said chuck whereby said chuck and driver may rotate in unison while permitting such free reciprocation of said driver relative to said chuck, said driver having a front socket for receiving the shank of a drill steel, a drill steel having a shank receivable in said socket, means for rigidly locking said steel shank to said driver whereby the latter and said steel may reciprocate and rotate together, said driver having a reduced cylindrical rearward portion located rearwardly of said sliding interlocking connection and adapted to receive impact blows, and a wear bushing carried by said rotatable chuck and in which said reduced cylindrical driver portion is reciprocably and rotatably guided, said driver portion turning in said bushing upon rotation of said driver relative to said chuck as aforesaid.

3. In a rock drill, a rotatable chuck having a chamber and a forwardly located bore in its forward portion, a reciprocable drill steel driver contained in said chamber of said chuck, means effective upon rotation of said driver relative to said chuck for locking said driver within said chuck chamber while permitting free reciprocation of said driver relative to said chuck, means providing a sliding interlocking connection between said driver and said chuck whereby said chuck and driver may rotate in unison while permitting such free reciprocation of said driver relative to said chuck, said driver having a front socket for receiving the shank of a drill steel, a drill steel having a shank receivable in said socket, means for rigidly locking said steel shank to said driver whereby the latter and said steel may reciprocate and rotate together, said driver having a reduced cylindrical rearward portion located rearwardly of said sliding interlocking connection and adapted to receive impact blows, and a wear bushing carried by said rotatable chuck and in which said reduced cylindrical driver portion is reciprocably and rotatably guided, said driver portion turning in said bushing upon rotation of said driver relative to said chuck as aforesaid, and said driver having a forward cylindrical bearing surface in advance of said interlocking connection and mounted in said bore in the forward portion of said chuck.

4. In a rock drill, a rotatable chuck having an internal chamber and an internal circular flange at its forward end surrounding a front bore and providing the front wall of said chamber, said flange having key slots extending therethrough and opening into said front bore, the walls of said chamber having grooves formed therein with portions of said grooves aligned with said key slots, said grooves having lateral portions disposed out of alignment with said key slots, and a reciprocable drill steel driver received in said chamber and having external keys, said keys as said driver is inserted in said chuck passing through said key slots into said registering portions of said grooves, and said keys when positioned in said grooves being movable, upon turning of said driver relative to said chuck, laterally into said lateral groove portions out of alignment with said key slots to lock said driver within said chuck, and the ends of said enlarged groove portions providing surfaces which drivingly abut the adjacent surfaces of said keys whereby said chuck as it is rotated effects rotation of said driver, a drill steel having a shank, and said driver having a front socket for receiving the shank of said drill steel and in which the steel shank is rigidly secured whereby said driver and said drill steel reciprocate together.

5. In a rock drill, a rotatable and reciprocable drill steel driver having a socket for receiving the shank of a drill steel, the forward portion of said socket having a polygonal entrance opening provided with cam surfaces formed on its side walls, said cam surfaces becoming increasingly wider as they extend rearwardly, and a drill steel having a shank receivable in said socket and formed with a lugged portion of polygonal cross section corresponding to the cross section of said polygonal opening, said lugged portion having forwardly and inwardly tapered surfaces, and said lugged portion, as said steel shank is inserted in said socket, entering said polygonal opening and said inclined surfaces on said lugged portion, as said shank is rotated slightly relative to said driver, engaging said cam surfaces to effect rearward endwise movement of said shank in said driver and to lock said shank within said driver.

6. In a rock drill, a reciprocable and rotatable drill steel driver having a socket for receiving the shank of a drill steel, a drill steel having a shank receivable in said socket, and means on said steel shank cooperating with said driver for rigidly locking said shank in said socket, said locking means including cooperating surfaces on said driver and said shank which are effective upon partial relative rotation of said driver and said shank for effecting such locking of said shank and concurrently imparting a rearward endwise thrust to said shank in said socket.

7. In a rock drill, a reciprocable and rotatable drill steel driver having a socket for receiving the shank of a drill steel, a drill steel having a shank receivable in said socket, and means on said steel shank cooperating with said driver for rigidly locking said shank in said socket, said locking means including cooperating surfaces on said driver and said shank which are effective upon relative rotation of said driver and said shank for imparting a rearward endwise thrust to said shank in said socket, and said locking means also including cooperating portions on said driver and said shank movable out of registry when said driver and said shank are partially relatively rotated for preventing forward release of said shank from said socket.

8. In a rock drill, a reciprocable chuck having a socket, a drill steel having a shank receivable in said socket, and means for locking said shank in said socket including an entrance opening of irregular outline formed within said chuck at the mouth of said socket and a lugged portion on said steel shank, said lugged portion as said shank is inserted in said socket moving through said opening, and said lugged portion when the steel is turned slightly relative to said chuck moving out of registry with said opening thereby to lock said steel shank against forward movement from said socket.

9. In a rock drill, a reciprocable chuck having a socket, a drill steel having a shank receivable in said socket, and means for locking said shank in said socket including an entrance opening of irregular outline formed within said chuck at the mouth of said socket and a lugged portion on said steel shank, said lugged portion as said shank is inserted in said socket moving through said opening, and said lugged portion when the steel is turned slightly relative to said chuck moving out of registry with said opening thereby to lock said steel shank against forward movement from said socket, and said opening and said shank having coacting cam surfaces effective upon rotation of said steel relative to said chuck to impart an endwise rearward thrust to said shank to seat the latter firmly against the rear wall of said socket.

10. In a rock drill, a rotatable chuck having a chamber and a central forward opening communicating with said chamber, a drill steel driver reciprocably mounted in said chamber of said chuck and having a socket for receiving the shank of a drill steel, a drill steel having a shank receivable in said driver-socket, means for rigidly locking said steel shank within said driver-socket, means for slidingly interlocking said driver with said chuck whereby said chuck and driver rotate in unison while permitting free reciprocation of said driver relative to said chuck, said interlocking means including spaced lugs on said driver and coacting driving lugs within said chuck, and means for detachably locking said driver within said chuck including spaced recesses in the walls of said central forward opening, said spaced driver lugs entering and passing through said recesses when said driver is inserted into said chuck through said opening, said driver being rotatable in one direction in said chuck relative to the latter to bring said spaced driver lugs out of registry with said recesses to lock said driver lugs within said chuck with said driver lugs located intermediate said recesses, said driver lugs engaging said coacting driving lugs to limit such rotation of said driver relative to said chuck, said driver lugs slidingly engaging said coacting driving lugs as said driver reciprocates relative to said chuck during its rotation with said chuck, and said driver being forwardly releasable with said steel shank from said chuck when said driver is rotated in the opposite direction relative to said chuck to bring said driver lugs back into registry with said recesses within said chuck.

11. In a rock drill, a rotatable chuck, a drill steel driver reciprocable in said chuck and having a socket for slidingly axially receiving the shank of a lugged drill steel, means for slidingly interlocking said driver with said chuck whereby said chuck and driver rotate in unison while permitting free reciprocation of said driver relative to said chuck, and means within said driver engaging the steel lugs for rigidly securing the shank of the drill steel in said socket whereby said steel rotates and reciprocates with said driver.

12. In a rock drill, a reciprocable chuck member adapted for reciprocable mounting in the bore of a guide and having a socket for receiving the shank of a drill steel, a drill steel having a shank received in said socket, and means for locking said steel shank in said socket whereby said chuck member and steel may reciprocate in unison including an opening of polygonal cross section at the entrance of said socket and a polygonal lugged portion on said shank insertible through said opening, said steel being rotatable when in position in said chuck to move said lugged portion out of registry with said opening whereby portions of the opening walls overlie portions of said lugs to lock the steel shank against forward release from said socket.

13. In a rock drill, a chuck having a socket for receiving the shank of a drill steel, a drill steel having a shank received in said socket, and means for locking said steel shank in said socket including an opening of polygonal cross section at the entrance of said socket and a polygonal lugged portion on said shank insertible through said opening, said steel being rotatable when in position in said chuck to move said lugged portion out of registry with said opening whereby portions of the opening walls overlie portions of said lugs to lock the steel shank against forward release from said socket, and coacting cam surfaces on said lugged portion and the walls of said opening for imparting an inward thrust to said shank in said socket as said steel is rotated to effect locking thereof.

14. In a rock drill, a chuck housing having a bore, a rotatable chuck sleeve in said bore, a front chuck part arranged in said bore and connected to said chuck sleeve for rotation therewith, a drill steel driver reciprocably mounted in said front chuck part and having a socket for receiving the shank of a drill steel, means for rigidly locking said steel shank to said driver for rotation and reciprocation therewith, means for slidingly interlocking said driver with said front chuck part, said driver having a reduced rearward cylindrical portion for receiving impact blows, and a guide bushing secured in and supported by said chuck sleeve for guiding said reduced rearward portion, said guide bushing being located in adjacency to the point where said cylindrical portion of said driver receives the impact blows.

15. In a rock drill, a chuck housing having a bore, a chuck sleeve rotatable in said bore, a front chuck part connected to said sleeve for rotation therewith and arranged in said bore, a reciprocable driver arranged in said front chuck part and having a socket for receiving the shank of a drill steel, means for rigidly locking said shank in said driver, means for slidingly interlocking said driver with said front chuck part, said driver having forward external cylindrical guide surface and said front chuck part having a bore for slidingly receiving said cylindrical guide surface, said driver having a reduced cylindrical rearward portion for receiving impact blows, and guiding means within said chuck sleeve for slidingly receiving and guiding said cylindrical rearward portion, said guiding means being located in adjacency to the point where said cylindrical rearward portion receives the impact blows.

16. In a rock drill, a drill steel driver mounted for reciprocatory and rotary movements and having a socket for receiving the shank of a drill steel, coacting means on said driver and steel shank for rigidly locking said shank within said driver, said driver having a front external cylindrical bearing surface and a reduced rearward portion for receiving impact blows, said rearward portion having a cylindrical external bearing surface, said cylindrical bearing surfaces on said driver being adapted slidingly to engage guide bearing surfaces of an associated part, and said driver having longitudinal spline portions engageable with splineways and arranged longitudinally between said cylindrical bearing surfaces.

17. In a rock drill, a chuck mechanism having a rotatable chuck part, a drill steel having a shank, a driver rigidly secured to said steel shank and receivable in said chuck part, means for slidingly interlocking said chuck part and said driver together whereby said driver may reciprocate with the steel shank while interlocking relation of said driver with said chuck part is maintained, and cooperating interengaging locking elements on said driver and chuck part for detachably locking said driver within said chuck part and releasable upon relative rotation of said chuck part and said driver to move certain of said locking elements out of locking engagement with the others thereby to permit free forward axial withdrawal of said driver from said chuck part.

18. In a rock drill, a chuck mechanism having a rotatable chuck part, a drill steel having a shank, a driver rigidly secured to said steel shank and receivable in said chuck part, means for slidingly interlocking said chuck part and said driver together whereby said driver may reciprocate with the steel shank while interlocking relation of said driver with said chuck part is maintained, and coacting locking portions on said chuck part and said driver for locking said driver in said chuck part while permitting such reciprocation of said driver, said locking portions being movable out of locking engagement upon relative rotation of said chuck part and said driver thereby to permit free forward axial withdrawal of said driver from said chuck part.

19. In a rock drill, a drill steel having a shank which is formed with a smooth exterior surface, a driver receivable in the chuck of a drill and having a socket for receiving the steel shank and provided with a smooth bore in which the steel shank has a tight press fit, and coacting means on said driver and said steel for rigidly locking said shank within said driver, said coacting means including coacting cam and abutment surfaces respectively on said driver and said steel shank for effecting, upon relative rotation of the parts, inward axial sliding movement of said steel shank within said socket, and said socket having a rear wall with which said steel shank abuts.

JOHN C. CURTIS.

REFERENCES CITED

The following references are of record in the file of this patent:

UNITED STATES PATENTS

| Number | Name | Date |
| --- | --- | --- |
| 1,233,477 | Hultquist | July 17, 1917 |
| 1,588,407 | Gilman | June 15, 1926 |
| 1,708,975 | Skaer | Apr. 16, 1929 |
| 1,800,390 | Katterjohn | Apr. 14, 1931 |
| 2,461,530 | Curtis | Feb. 15, 1949 |